United States Patent [19]

Jones et al.

[11] 4,182,827

[45] Jan. 8, 1980

[54] POLYURETHANE HYDROGELS HAVING ENHANCED WETTING RATES

[75] Inventors: Allen P. Jones, Charleston; Robert J. Knopf, Saint Albans, both of W. Va.

[73] Assignee: Union Carbide Corporation, New York, N.Y.

[21] Appl. No.: 938,702

[22] Filed: Aug. 31, 1978

[51] Int. Cl.$^2$ ............................................... C08G 18/10
[52] U.S. Cl. ........................................ 528/60; 528/61
[58] Field of Search ...................... 528/60, 61; 521/159

[56] References Cited

U.S. PATENT DOCUMENTS

| | | | |
|---|---|---|---|
| 3,939,105 | 2/1976 | Jones et al. | 428/364 |
| 3,939,123 | 2/1976 | Matthews et al. | 528/60 |
| 3,940,542 | 2/1976 | Knopf et al. | 428/364 |

*Primary Examiner*—Maurice J. Welsh
*Attorney, Agent, or Firm*—Franklyn Schoenberg

[57] ABSTRACT

The wetting rates of polyurethane hydrogels comprising lightly crosslinked polymers of isocyanate terminated prepolymers which are the reaction product of (i) poly(alkyleneoxy) polyols with (ii) organic diisocyanates that has been lightly crosslinked with (iii) water or an organic polyamine are enhanced by treating the surface of the solid hydrogel with certain ketones, alcohols, organic amines, aromatic hydrocarbons or aqueous alkali metal hydroxide solutions.

12 Claims, No Drawings

POLYURETHANE HYDROGELS HAVING ENHANCED WETTING RATES

BACKGROUND OF THE INVENTION

The use of fibrous materials as absorbents for moisture is a well known, widespread practice. In this application many of the natural and synthetic fibers have been used and extensive efforts have been made to improve the absorption properties of the materials. One of the major deficiencies of the natural and synthetic materials heretofore used has been the tendency for them to release the absorbed moisture when pressure has been applied to the moisture containing material. The fact that pressure causes the absorbed fluid to be expelled from the fibers is known as reversible absorption. For many applications, however, irreversible absorption is desired, for example, in surgical dressings, diapers, bed pads, catamenials, and the like, whereby the absorbed moisture is retained in the absorbent material under an applied pressure.

Within the past few years recent innovations have resulted in the production of materials having such irreversible absorption properties; these materials are now known as hydrogels. In most instances they have been produced in powder or particulate form and even, in some instances, in film form. An especially interesting characteristic of the hydrogel polymers is that when in contact with water they absorb it and swell to a certain point and stop and the final swollen polymer is still similar in shape to its initial unswollen shape. Many of the hydrogels have the ability to absorb many times their original weight in water without becoming soggy or deformed. In general, the hydrogels are used in conjunction with other materials as supports. Among the United States patents that have issued in this field are U.S. Pat. Nos. 3,669,103; 3,589,364; 3,694,301; 3,670,732; 3,164,565. This is but an exemplary listing and should not be considered complete. In addition, there are U.S. Pat. Nos. 3,939,105, 3,939,123 and 3,940,542 which are concerned with the polyurethane hydrogels whose wetting rates were still not completely satisfactory for some applications.

SUMMARY OF THE INVENTION

The surface of the water swellable, lightly crosslinked, polyurethane hydrogels are treated with treating compounds which are certain ketones, alcohols, organic amines, aromatic hydrocarbons or aqueous alkali metal hydroxides, to enhance the wetting rate of the hydrogels. The treated hydrogels are then dried and stored. The polyurethane hydrogels are the reaction products of an isocyanato terminated prepolymer comprising the reaction product of (i) poly(alkyleneoxy) polyol having an average molecular weight up to about 25,000 with (ii) organic diisocyanate, wherein said isocyanato terminated prepolymer is lightly crosslinked with (iii) a crosslinking agent that is water or an organic polyamine, the amount of crosslinking agent used being an equivalent amount based on the number of equivalents of isocyanato groups present in the prepolymer.

DESCRIPTION OF THE INVENTION

The poly (alkyleneoxy)polyols that are used in producing the polyurethane hydrogel polymers that are treated in accord with the process of the present invention are those having a molecular weight up to about 25,000. These polyols can be diols, triols or tetrols, with the molecular weight of the polyol varying depending upon which is used.

The suitable diols are the poly (ethyleneoxy) glycols which have a molecular weight of from about 4,000 to 25,000, preferably from about 6,000 to 20,000. These diols are well known and many are commercially available. Minor amounts, preferably up to about 35 weight percent of a poly (propyleneoxy) glycol or a poly (butyleneoxy) glycol can also be present. The polyols can be block or random copolymers containing mixtures of ethyleneoxy, propyleneoxy, or butyleneoxy units.

The triols and tetrols that can be used are those having a molecular weight of from about 92 to 5,000, preferably from about 500 to 1,500. These can be the poly (alkyleneoxy) polyols wherein the alkyleneoxy group contains 2 to 4 carbon atoms and they can be homopolymers or block or random copolymers having three or four reactive hydroxyl groups. One can also use the aliphatic polyhydroxyl compounds of the formula $C_nH_{2n+2-m}(OH)_m$ wherein n is an integer having a value of from 3 to 6 and m has a value of 3 or 4.

Illustrative of the suitable polyols are poly(ethyleneoxy) diol, poly (propyleneoxy) diol, poly(butyleneoxy) diol, copoly (ethyleneoxy-propyleneoxy) diol, poly (ethyleneoxy) triol, poly (ethyleneoxy) tetrol, poly(propyleneoxy) triol, copoly (ethyleneoxy-propyleneoxy) triol, copoly (ethyleneoxy-butyleneoxy) triol, glycerine, sorbitol, 1,2,6-hexanetriol, trimethylolpropane, pentaerythritol, dipentaerythritol, and the like. The alkylene adducts of the mono or polyamines such as ethylamine, ethanolamine, diethanolamine, ethylenediamine, propylenediamine, isopropanolamine, hexamethylenediamine, and the like. Mixtures thereof can be used if desired. In addition, one can include some polycaprolactonepolyol, or conventional polyester polyol.

The hydrogels can be produced by reacting the poly (alkyleneoxy) diol with an organic diisocyanate to form an isocyanato terminated prepolymer which is then lightly corsslinked with a crosslinking agent that is a mixture of an organic diamine and an organic triamine. In another embodiment, the hydrogels can be produced by reacting a mixture of poly (alkyleneoxy) diols and poly (alkyleneoxy) triols and/or tetrols with an organic disisocyanate to form the prepolymer which is then lightly crosslinked with a crosslinking agent that is water, an organic diamine, or a mixture thereof. When a mixture of polyols is used in producing the hydrogels the mole ratio of the diol to the higher polyols is at least about 6:1 and can be as high as about 40:1. Preferably this mole ratio is from about 15:1 to about 30:1, and more preferably from about 20:1 to about 25:1. It has been observed that the mole ratio of diol to higher polyol has an effect on water uptake; the higher the mole ratio, the higher the water uptake.

Any of the known organic diisocyanates can be used in the reaction with the polyol to produce the isocyanato terminated prepolymer. These isocyanates are well known to those skilled in the polyurethane art and illustrative thereof one can mention, tolylene diisocyanate, phenylene diisocyanate, hexamethylene dissocyanate, isophorone diisocyanate, methylene bis-(4-phenylisocyanate), 4,4'-methylene bis(cyclohexylisocyanate), 4,4'-methylene bis(o-tolylene isocyanate), dimer acid diisocyanate, 4,4'-methylene bis (phenyleneisocyanate, 2,2,4-trimethylpentane diisocyanate, aniline-formaldehyde polyisocyanates having an average of from about 2 to about 3 isocyanato groups per molecule.

In producing the isocyanato terminated prepolymer one reacts an excess of the isocyanate with the polyol. The ratio of isocyanato groups to hydroxyl is from about 1.2 to 1.6 equivalents of isocyanato per equivalent of hydroxyl. An equivalent amount of isocyanato sufficient to react with any water present in the reactants can also be added. It has been observed that at lower ratios the hydrogel polymer becomes too soluble, while at ratios above 1.6:1 the water uptake of the hydrogel decreases. In this reaction any of the known catalysts can be used such as dibutyltin dilaurate, stannous octoate, triethylenediamine, lead octoate, bis(dimethylamino) ethyl ether, and the like. The catalyst is present at a concentration of from about 0.001 to about 1 percent by weight. The conventional catalytic amounts are employed.

Production of the isocyanato terminated prepolymer is carried out in the presence of an inert organic solvent such as benzene, toluene, trichloroethane, trichloroethylene, bis(2-chloroethyl) ether, methyl ethyl ketone, ethylene dichloride, ethyl acetate, xylene, and the like.

The temperature at which the prepolymer is produced can vary from about 50° C. to about 170° C. and is not critical to the reaction. The time required to carry the reaction the completion will vary depending upon the particular reactants and catalyst used, the size of the batch and other factors known to those skilled in the art. The reaction for the preparation of the prepolymer is preferably carried out under anhydrous conditions and under an inert gas atmosphere.

The product obtained in this first step is an isocyanato terminated prepolymer that is soluble in the organic solvent used in carrying out the reaction. This solution has a solids content dependent upon the amount of materials initially charged. For ease in further handling it is preferred that the solids content be not greater than about 40 weight percent, preferably from 25 to 35 weight percent. The solution viscosity should range from 15,000 to about 200,000 centipoises.

To produce the hydrogel polymer from the above isocyanato terminated prepolymer, one reacts this prepolymer with a crosslinking agent to effect a light degree of crosslinking. The term lightly crosslinked hydrogel polymer signifies a hydrogel that contains not more than an average of about one crosslink unit per 50,000 average molecular weight of the hydrogel. Preferably there is an average of about one crosslink unit for each 100,000 to 300,000 hydrogel molecular weight and more preferably about one crosslink unit for each 150,000 to 250,000 hydrogel molecular weight. As previously indicated, the suitable crosslinkers are water or the organic polyamines, such as the primary or secondary diamines or triamines. The polyamines can be any of the known aliphatic or aromatic polyamines such as ethylene diamine, diethylene traimine, propylene diamine, hexamethylene diamine, methylene bis (aniline), tolylene diamine, isophorone diamine, trimethylpetane diamine, aniline-formaldehyde adduct polyamines, and the like. The amount of crosslinking agent used is an amount sufficient to react with all of the terminal isocyanato groups and to effect a light crosslinking. The desired concentration of crosslinker is that wherein the equivalents of reactive crosslinking groups in the crosslinking agent used is equivalent to the number of equivalents of isocyanato groups present in the prepolymer. This amount should be sufficient to react with all of the isocyanato groups and crosslink the polymer but it should not be an amount which would result in end-capping of the isocyanato groups rather than crosslinking.

The solid polyurethane hydrogels can be produced in the shape of pellets, films or fibers by procedures known in the art and disclosed in the patents previously identified. The surface of the shaped hydrogels can be treated by spraying or soaking with the treating composition containing the surface treating compound.

The surface treating compounds are (a) liquid ketones of the general formula:

wherein R & R' are alkyl groups having from 1 to 6 carbon atoms, and wherein R' can also be a phenyl group; (b) a liquid alkanol having from 1 to 6 carbon atoms, preferably 1 to 3 carbon atoms; or (c) an organic amine having up to 12 carbon atoms, preferably up to 3 carbon atoms, which can be aliphatic, cycloaliphatic or aromatic; or (d) an aromatic hydrocarbon having from 6 to 10 carbon atoms, preferably 6 to 8 carbon atoms; or (e) a cyclic oxide having from 2 to 4 ring carbon atoms; or (f) an aqueous solution of an alkali metal hydroxide.

The amount of surface treating compound applied to the surface of the hydrogel articles will vary from about 0.05 to 5 weight percent based on the weight of the hydrogel, preferably from about 0.1 to 2 weight percent.

The treating composition can also be a mixture of water and the surface treating compound. Water alone does not appear to affect the Wetting Rate (as hereafter defined).

One can also have present in the treating composition containing the organic surface treating compounds defined above a surfactant at a concentration of from 0 to 5 weight percent, or more, preferably from 0.01 to 3 weight percent, most preferably from 0.5 to 2 weight percent, based on the weight of surface treating compound. Any of the known anionic or nonionic surfactants can be used if desired. The surfactants are well known to those skilled in the art and do not require further definition herein, in view of the large numbers thereof that are commercially available. The sole requirement is that the selected surfactant does not have a deleterious effect on the hydrogel or its intended application or use. Illustrative thereof one can mention the alkyl phenal ethoxylates having from 6 to 20 carbon atoms in the alkyl group, the linear or hanched fatty alcohol ethoxylates, the linear or hanched fatty acid ethoxylates, the sulfated fatty alcohol ethoxylates, the alkyl benzene sulfonates, the ethylene oxide/propylene oxide adducts of the amines alcohols and carboxylic acids, quarternary ammonium compounds containing one or more long chain hydrocarbon groups (e.g. disteary dimethyl ammonium chloride, lauryl pyridinium bromide, cetyl pyridinium bromide).

Illustration of suitable surface treating compounds one can mention acetone, acetophenone, methyl ethyl ketone, methyl isobutyl ketone, diethyl ketone, methyl propyl ketone, ethyl butyl ketone, dibutyl ketone, cyclohexanone, pyrallidone, methanol, ethanol, propanol, isopropanol, butanol, isobutanol, t-butanol, the pentanols, cyclohexanol, the hexanols, methyl amine, dimethyl amine, trimethyl amine, methyl ethyl amine, ethyl amine, triethyl amine, tributyl amine, hexyl amine, piperidine, pyridine, morpholine, decylamine, benzene, toluene, xylene, ethylene oxide, propylene oxide, trimethylene oxide, tetrahydrofuran; aqueous solutions containing up to about 5 weight percent of an alkali metal such as lithium, sodium or potassium hydroxide, the solution perferably contains from 0.5 to 2 weight percent of the hydroxide.

The treating compositions are applied to the surface of the hydrogel article by any convenient process. Thus, they can be sprayed on to the surface or the hydrogel article can be immersed into the treating composition. The amount of surface treating compound applied to the surface will vary from about 0.05 to 5 weight percent, preferably from 0.1 to 2 weight percent, of the hydrogel. After application of the surface treating compound, the treated hydrogel articles are dried at temperatures below the softening point of the hdyrogel. This can vary from 20° C. to 150° C. and, if desired, can be carried out under vacuum conditions.

The treatment of the surface of the polyurethane hydrogel articles with the above-defined surface treating compounds significantly improves the water absorption rate of the hydrogel, thereby decreasing the time required for the water to penetrate into the hydrogel and be absorbed by it. It was found that the rate of absorption could be increased to the extent that in some instances the Wetting Rate of the treated hydrogel was less than one-half of the Wetting Rate of the untreated hydrogel.

The rate of absorption was determined by using a random selection of the shaped hydrogel articles, e.g. the pellets, spaced on a glass microscopic slide. A drop of distilled water was placed onto the individual article or pellet while observing under a microscope. The Wetting Rate was determined visually using a stopwatch to ascertain the time required for the entire article or pellet ot become transparent, an indication that water was absorbed completely throughout its cross-section. The procedure is repeated from 3 to 6 times for each sample and the average of the results is reported as the Wetting Rate. For comparative purposes the Wetting Rate of the untreated hydrogel polymer from the same batch is also determined.

A polyurethane hydrogel was produced for treatment in accord with this invention. A mixture was prepared containing 1,350 grams of poly (oxyethylene) diol having an average molecular weight range of from 6,000 to 7,5000, 9.08 grams of poly (oxyethylene) triol having an average molecular weight range of from 950 to 1050 and 2,632 grams of trichloroethylene and heated to 76° to 91° C. while refluxing to remove 2.4 ml. of water. The solution was cooled to 86° C. and 58.35 grams of methylene bis(4-phenylisocyanate) were added to the reactor contents. The mixture was stirred at 86° to 90° C. for 2 hours after adding about 10 drops of dibutyltin dilaurate catalyst. The isocyanato/hydroxyl ratio was 1.42/1. The prepolymer solution had a total solids content of 35 percent, a Brookfield viscosity of 101,520 cps at room temperature and an equivalent weight of 45,470. It was diluted with trichloroethylene to a 13.5 percent total solids content and then impregnated with 2,270 grams of naphtha to give a prepolymer solution of 11.1 percent total solids having a Brookfield viscosity of 460 cps at 22° C.

A coagulating bath was prepared containing naphtha that was approximately 0.0001 N with ethylene diamine as the crosslinking agent. The prepolymer solution was extruded through a manifold head having 20 holes each 0.43 mm. in diameter in the form of droplets which were allowed to fall through an ambient air space of about 30 cm. and then into the coagulating bath and onto a conveyer belt. The pellets that form are carried through the bath a distance of about 90 cm. during which time the trichlorethylene solvent is extracted by the naphtha and corsslinking takes place. After pellets exit the bath they are dried at 40° C.; they had an average size of about 4.75 mm. (Pellets A). A portion of the pellets was ground and the resulting granules had an average size of about 0.76 mm. (Granules A). The Wetting Rates of the pellets and granules were determined by averaging the results of four runs of each; they were:

Pellets A: 455.5 seconds or 7.6 minutes

Granules A: 203.8 seconds or 3.4 minutes It was noted that the variation in time of each run was greater for the granules. This was attributed to their irregular particle size and their fractured skin surfaces.

The hydrophobic effect on Wetting Rate caused by the residual coagulating solvent on the surface of the pellets was further demonstrated by spraying the surface of Pellets A with naphtha until the surface was thoroughly wetted and then drying at 40° C. under 50.8 cm. vacuum. The Wetting Rate of these treated pellets was 614.4 seconds or 10.25 minutes (average of 6 runs; Comparative I). This hydrophobic effect can be overcome by the addition of a surfactant to the naphtha sprayed onto the pellets, the procedure being in accord with this invention as shown in Example 1.

EXAMPLE 1

Three treating compositions were prepared containing naphtha and 0.5%, 1.0% and 2.0% of the dioctyl ester of sodium sulfosuccinic acid as the contained anionic surfactant. The surfaces of separate portions of Pellets A were sprayed with each of the treating compositions until wetted and dried at 40° C. under a 50.8 cm. vacuum. The Wetting Rate of each was then determined and the average of 6 runs is recorded below:

| Comparative A | 614 seconds | — |
| With 0.5% Surfactant: | 362 seconds | 1.70 |
| With 1.0% Surfactant | 284 seconds | 2.16 |
| With 2.0% Surfactant | 263 seconds | 2.34 |

In the third column, there is indicated how much faster the Wetting Rate of the pellets treated with the composition containing the surfactant is as compared to the Wetting Rate of Comparative A, which did not employ the surfactant. Thus, by the use of as little as 0.5% of surfactant the Wetting Rate was 1.7 times as fast.

EXAMPLE 2

A series of acetone-containing treating compositions was prepared containing from 0 to 2 weight percent of the nonionic surfactant nonylphenyl polyethylene glycol ether (having an average of 10.5 exyethylene groups). Separate portions of Pellets A were sprayed with each treating composition to thoroughly wet the surfaces and then dried at 40° C. under a 50.8 cm. vacuum. The Wetting Rate of each treated portion of Pellets A was then determined and the average of 3-4 test runs on each is reported below and compared to that of the untreated Pellets A:

| Untreated Pellets A: | |
| Untreated Pellets A (Control) | 455 seconds |
| Acetone + 0% Surfactant | 335 seconds |
| Acetone + 0.01% Surfactant | 211 seconds |

| Treating Compositions | Wetting Rate |
|---|---|
| Acetone + 0.1% Surfactant | 207 seconds |
| Acetone + 0.25% Surfactant | 211 seconds |
| Acetone + 0.5% Surfactant | 202 seconds |
| Acetone + 1.0% Surfactant | 204 seconds |
| Acetone + 2.0% Surfactant | 206 seconds |

The results show that the use of acetone alone improved the Wetting Rate of the hydrogel pellets and that the addition of as little as 0.01% of the surfactant to the acetone treating composition has a significant effect on the Wetting Rate.

EXAMPLE 3

In this example Pellets A and Granules A were dipped into the treating composition rather than sprayed with it and the treated hydrogel articles were then dried at 40° C. under a 50.8 cm. vacuum. The treating compositions employed and the Wetting Rates of the treated hydrogels are set forth in the following table; the Controls are untreated Pellets A and Granules A.

| Treating Compositions | Wetting Rate, Seconds | |
|---|---|---|
| | Pellets A | Granules A |
| Controls | 455 | 204 |
| Acetone | 376 | 121 |
| Acetone + 2% Surfactant I | 216 | 123 |
| Acetone + 5% Surfactant II | 216 | 121 |
| Acetone + 2% Surfactant II | 215 | 121 |
| Acetone + 5% Surfactant II | 216 | 114 |
| Acetone + 2% Surfactant III | 208 | 121 |
| Acetone + 5% Surfactant III | 192 | 117 |
| Acetone + 2% KOH Solution* | 204 | 112 |
| Acetone + 5% KOH Solution | 199 | 110 |

Surfactant I is trimethylnonyl polyethylene glycol ether having an average of 10 oxyethylene groups (nonionic)
Surfactant II is nonylphenyl polyethylene glycol ether having an average of 10.5 oxyethylene groups (nonionic)
Surfactant III is dioctyl ester of sodium sulfosuccinic acid (anionic)
*10% aqueous solution The results clearly show the improvement in Wetting Rates achieved when the hydrogel articles are treated in accord with this invention.

EXAMPLE 4

In this example the treating composition was a mixture of water and surfactant. Separate portions of each of Pellets A and Granules A were sprayed to wet the surfaces with the treating compositions and then dried at 40° C. under a 50.8 cm. vacuum. The treating compositions employed and the Wetting Rates of the treated hydrogels are set forth in the following table. The Controls are untreated Pellets A and Granules A. In addition portions were treated in the same manner with water alone; as can be seen treatment with water did not improve the Wetting Rate whereas treatment with the treating composition consisting of water plus surfactant significantly improved the Wetting Rate.

| Treating Compositions | Wetting Rate | |
|---|---|---|
| | Pellets A | Granules A |
| Controls | 455 | 204 |
| Water only | 464 | 210 |
| Water + 0.5% Surfactant II* | 209 | 111 |
| Water + 2% Surfactant II | 210 | 112 |
| Water + 0.5% Surfactant I* | 211 | 107 |
| Water + 2% Surfactant II* | 212 | 109 |

*See footnotes to Example 3 table

EXAMPLE 5

A series of experiments was carried out whereby Pellets A and Granules A were treated with aromatic hydrocarbons, ketones, alkanols, cyclic oxides and amines. The hydrogel particles were dipped into treating composition and then dried at 40° C. under a 50.8 cm. vacuum. Surfactant II of Example 3 was added in some instances. The Controls are untreated Pellets A and Granules A.

| Treating Compositions | Wetting Rate | |
|---|---|---|
| | Pellets A | Granules A |
| Controls | 455 | 204 |
| Benzene | 350 | 120 |
| Benzene + 0.5% Surfactant II | 353 | 117 |
| Toluene | 355 | 119 |
| Toluene + 0.5% Surfactant II | 333 | 114 |
| Acetophenone | 348 | 116 |
| Acetophenone + 0.5% Surfactant | 350 | 116 |
| Methyl isobutyl ketone | 345 | 112 |
| Methyl isobutyl ketone + 0.5% + 0.5% Surfactant II | 350 | 114 |
| Methanol | 347 | 115 |
| Methanol + 0.5% Surfactant II | 345 | 114 |
| Ethanol | 325 | 117 |
| Ethanol + 0.5% Surfactant II | 208 | — |
| Ethanol + 1% Surfactant II | 206 | 105 |
| Ethanol + 2% Surfactant II | 212 | 104 |
| Propylene oxide | 355 | 120 |
| Propylene oxide + 0.5% Surfactant II | 352 | 116 |
| Tetrahydrofurane | 351 | 122 |
| Tetrahydrofurane + 0.5% Surfactant II | 344 | 119 |
| Pyridine | 354 | 118 |
| Pyridine + 0.5% Surfactant II | 360 | 119 |

What we claim is:
1. A method of improving the wetting rate of a water swellable, lightly crosslinked hydrogel polymer which comprises contacting said polymer with a surface treating composition comprising a mixture of:
(A) a surface treating compound selected from the group consisting of:
 (a) a liquid ketone of the formula RCOR' wherein R is an alkyl group of from 1 to 6 carbon atoms and R' is an alkyl group of 1 to 6 carbon atoms or phenyl,
 (b) a liquid alkanol having from 1 to 6 carbon atoms,
 (c) an aliphatic, cycloaliphatic or aromatic amine having up to 12 carbon atoms,
 (d) an aromatic hydrocarbon having from 6 to 10 carbon atoms,
 (e) a cyclic oxide having from 2 to 4 ring carbon atoms,
 (f) an aqueous solution of an alkali metal hydroxide; and
(B) from 0 to 5 percent by weight, based on the weight of (A), of a surfactant;
wherein said hydrogel polymer is the polymer of the isocyanato terminated prepolymer comprising the reaction product of:

(i) a poly (alkyleneoxy) polyol having an average molecular weight up to about 25,000 wherein the alkyleneoxy group contains from 2 to 4 carbon atoms, and (ii) an organic diisocyanate, said prepolymer lightly crosslinked with an equivalent amount of a crosslinking agent of the group:

(iii) water or organic polyamine; wherein said poly (alkyleneoxy) polyol is a mixture of a major amount of a poly (ethyleneoxy) diol having a average molecular weight of from about 4,000 to about 25,000, and a monor amount of a higher polyol of the group poly (alkyleneoxy) triol or poly (alkyleneoxy) tetrol or aliphatic polyhydroxy compound of the formula $C_nH_{2n+2-m}(OH)_m$ wherein n has a value of 3 to 6 and m has a value of 3 to 4, or mixtures thereof, said triol or tetrol having an average molecular weight of from about 92 to 5,000, wherein the mole ratio of diol to higher polyol in said mixture is from about 6:1 to 40:1; wherein the equivalents ratio of isocyanato groups to hydroxyl groups is from about 1.2:1 to about 1.6:1; wherein the organic polyamine is a primary or secondary diamine or triamine; and wherein the equivalents of reactive crosslinking groups in said crosslinking agent used is equivalent to the number of equivalents of isocyanato groups present in said prepolymer.

2. A method as claimed in claim 1, wherein Component (A) is a liquid ketone in which R and R' are alkyl having from 1 to 6 carbon atoms.

3. A method as claimed in claim 1, wherein Component (a) is acetone.

4. A method as claimed in claim 1, wherein Component (A) is a liquid alkanol having from 1 to 6 carbon atoms.

5. A method as claimed in claim 1, wherein Component (A) is methanol.

6. A method as claimed in claim 1, wherein Component (A) is ethanol.

7. A method as claimed in claim 1, wherein Component (A) is pyridine.

8. A method as claimed in claim 1, wherein Component (A) is benzene.

9. A method as claimed in claim 1, wherein Component (A) is toluene.

10. A method as claimed in claim 1, wherein Component (A) is propylene oxide.

11. A method as claimed in claim 1, wherein Component (A) is tetrahydrofurane.

12. A method as claimed in claim 1, wherein Component (A) is an aqueous solution of potassium hydroxide.

* * * * *

UNITED STATES PATENT AND TRADEMARK OFFICE
CERTIFICATE OF CORRECTION

PATENT NO. : 4,182,827
DATED : January 8, 1980
INVENTOR(S) : Allen P. Jones, et al.

It is certified that error appears in the above-identified patent and that said Letters Patent are hereby corrected as shown below:

Column 3, line 27, change the second occurrence of "the" to -- to -- .

Column 5, line 46, "7.5000," should read -- 7.500, -- .

Column 6, line 5, "corsslinking" should read -- crosslinking -- .

Column 4, lines 49 and 50, " hanced" should be -- branched -- .

Signed and Sealed this

Fourteenth Day of October 1980

[SEAL]

Attest:

SIDNEY A. DIAMOND

Attesting Officer

Commissioner of Patents and Trademarks